US011032978B2

(12) United States Patent
Bowling et al.

(10) Patent No.: US 11,032,978 B2
(45) Date of Patent: Jun. 15, 2021

(54) CLIMATE CONTROL SYSTEM FOR INDOOR HORTICULTURE

(71) Applicant: RAE CORPORATION, Pryor, OK (US)

(72) Inventors: Kyle Bowling, Pryor, OK (US); Jay Kindle, Pryor, OK (US)

(73) Assignee: RAE CORPORATION, Pryor, OK (US)

(*) Notice: Subject to any disclaimer, the term of this patent is extended or adjusted under 35 U.S.C. 154(b) by 0 days.

(21) Appl. No.: 17/047,289

(22) PCT Filed: Nov. 13, 2019

(86) PCT No.: PCT/US2019/061245
§ 371 (c)(1),
(2) Date: Oct. 13, 2020

(87) PCT Pub. No.: WO2020/102400
PCT Pub. Date: May 22, 2020

(65) Prior Publication Data
US 2021/0084835 A1 Mar. 25, 2021

Related U.S. Application Data

(60) Provisional application No. 62/760,454, filed on Nov. 13, 2018.

(51) Int. Cl.
A01G 9/24 (2006.01)
F24F 11/80 (2018.01)

(52) U.S. Cl.
CPC .............. A01G 9/246 (2013.01); F24F 11/80 (2018.01)

(58) Field of Classification Search
CPC ............ A01G 9/24; A01G 9/246; F24F 11/80
See application file for complete search history.

(56) References Cited

U.S. PATENT DOCUMENTS 3,478,817 A 11/1969 Shaw
5,020,333 A * 6/1991 Assaf ..................... A01G 9/246
62/271

(Continued)

FOREIGN PATENT DOCUMENTS

CA 2975559 A1 * 4/2017 ............... A01G 9/24

OTHER PUBLICATIONS

PCT International Search Report & Written Opinion mailed in corresponding PCT Application No. PCT/US2019/061245 dated Mar. 9, 2020; pp. 1-13.

Primary Examiner — Monica L Barlow
Assistant Examiner — Aaron M Rodziwicz
(74) Attorney, Agent, or Firm — McAfee & Taft

(57) ABSTRACT

Disclosed is a climate control system for use with an indoor plant growing environment. The system includes an air supply system and a refrigeration system. The refrigeration system utilizes a reheat coil in parallel with a condenser coil. In the airflow path of the air supply system the reheat coil is positioned downstream of the cooling coil. The method of operating the climate control system relies upon the input of set point values for enthalpy, dry bulb temperature and dew points into a controller. The controller receives data from sensors within the plant growing environment and uses this data to manage the operation of a three-way valve, supply fan speed, and compressor speed in order to maintain the indoor plant growing environment within an accepted range of each of the three set points.

9 Claims, 5 Drawing Sheets

(56) References Cited

U.S. PATENT DOCUMENTS

| | | | | |
|---|---|---|---|---|
| 5,228,303 | A | * | 7/1993 | Assaf .................. F28C 3/06 |
| | | | | 62/94 |
| 5,249,430 | A | * | 10/1993 | Assaf .................. A01G 9/246 |
| | | | | 62/94 |
| 5,324,229 | A | | 6/1994 | Weisbecker |
| 5,675,979 | A | | 10/1997 | Shah |
| 2004/0194371 | A1 | | 10/2004 | Kinnis |
| 2005/0087333 | A1 | | 4/2005 | Horn et al. |
| 2009/0076658 | A1 | | 3/2009 | Kinnis |
| 2014/0075977 | A1 | | 3/2014 | Elliott et al. |
| 2014/0231044 | A1 | * | 8/2014 | Duchesne .............. F24F 7/06 |
| | | | | 165/53 |
| 2015/0282440 | A1 | * | 10/2015 | Shelor ................ A01G 9/246 |
| | | | | 47/17 |
| 2018/0125016 | A1 | * | 5/2018 | Dufresne .............. A01G 9/246 |
| 2018/0220595 | A1 | * | 8/2018 | Hancock ................ A01G 9/26 |

* cited by examiner

CLIMATE CONTROL SYSTEM FOR INDOOR HORTICULTURE

BACKGROUND

Growing plants indoor on a large scale requires constant monitoring and control of the indoor plant environment. In particular, one must maintain target conditions of temperature and dew point in order to ensure plant health.

SUMMARY OF THE INVENTION

In one aspect this disclosure relates to an indoor plant growing system. The indoor plant growing system includes an air supply system and a refrigeration system. The air supply system includes a source of return air, a damper, an air supply fan, a cooling coil and a reheat coil. The refrigeration system includes a compressor, a three-way valve, a condenser coil, as well as the cooling coil and said reheat coil included in the air supply system. The reheat coil is positioned in parallel with said condenser in said refrigeration system downstream of said cooling coil in said air supply system. Additionally, the indoor plant growing system includes a controller configured to manage the operation of the air supply system and the refrigeration system, a plant environment and positioned within the plant environment is a dry bulb temperature sensor, and a dew point sensor. The dry bulb temperature sensor and dew point sensor provide data to the controller.

In another aspect, this disclosure relates to a method for maintaining the dry bulb temperature, dew point and enthalpy within an indoor plant growing environment within an accepted range of set point values. The method includes the steps of:

establishing a set point value for the dry bulb temperature of the indoor plant growing environment and establishing an accepted range above and below the dry bulb temperature set point value;

establishing a set point value for the dew point of the indoor plant growing environment and establishing an accepted range above and below the dew point set point value;

establishing a set point value for the enthalpy of the indoor plant growing environment and establishing an accepted range above and below the enthalpy set point value;

monitoring the dry bulb temperature of the indoor plant growing environment with a dry bulb temperature sensor;

monitoring the dew point of the indoor plant growing environment with a dew point sensor;

providing the monitored values of dry bulb temperature and dew point to a controller and said controller calculating the enthalpy of the indoor plant growing environment;

providing said indoor plant growing environment with an air supply system and a refrigeration system;

using the controller to manage the operation of the air supply system and said refrigeration system to maintain the dry bulb temperature within the accepted range above and below the dry bulb temperature set point value;

using the controller to manage the operation of the air supply system and said refrigeration system to maintain the dew point within the accepted range above and below the dew point set point value; and, using the controller to manage the operation of the air supply system and said refrigeration system to maintain the enthalpy within the accepted range above and below the enthalpy set point value.

DETAILED DESCRIPTION

Figure 5:
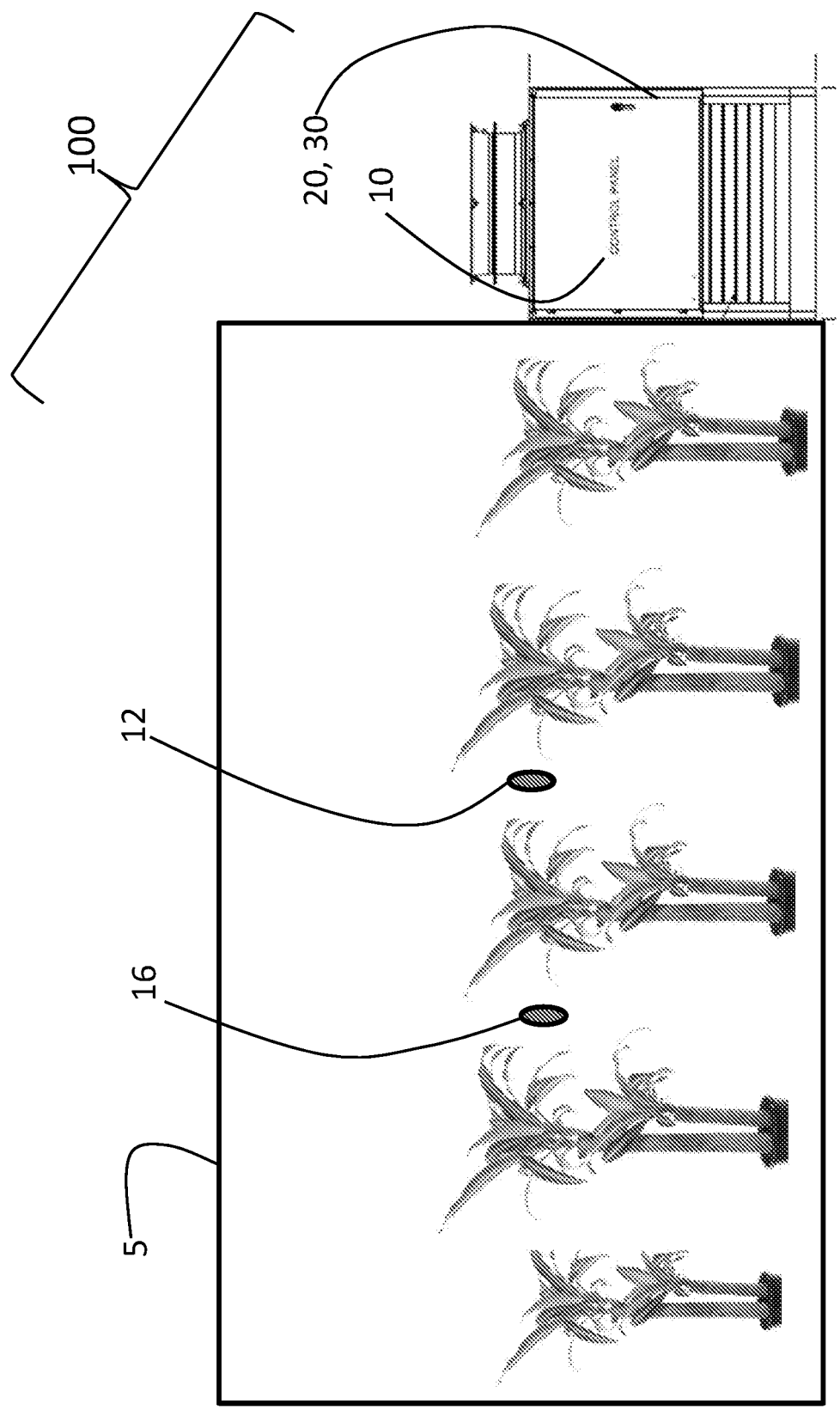
FIG. 5 depicts a climate control system for growing plants indoor.

The climate control system 100 disclosed herein utilizes a controller 10 to manage the operation of an air supply system 20 and a refrigeration system 30 associated with a plant growing room 5 or building. As depicted in FIG. 5, air supply system 20 and refrigeration system 30 are associated with room 5 or building used for growing plants, referred to herein as the plant environment 5. Ducts, not shown, provide fluid communication between air supply system 20 and refrigeration system 30 and plant environment 5. Although the following discussion refers to a single air supply system 20 and a single refrigeration system 30, climate control system 100 may include more than one of each system 20, 30 and the number of components in each system 20, 30 will be determined by the size of plant environment 5. For example, a 15 ton refrigeration system 30 may require a single compressor 36. However, a 60 ton refrigeration system 30 will typically require four compressors 36.

Air supply system 20 includes an air source 22 of return air from plant environment 5 and/or outside air, a damper 24, an air supply fan 26, a cooling coil 32 and a reheat coil 34. Refrigeration system 30 includes components common to air conditioning systems. As used herein, supply air refers to air that has passed through climate control system 100 exiting through air supply fan 26 and entering plant environment 5. Return air, provided by air source 22, refers to either air from outside of plant environment 5 and/or air removed from plant environment 5 and returned to climate control system 100. Thus, air source 22 provides return air from either source or a mixture of air from the outside of the plant environment 5 and air recycled from plant environment 5.

Figure 1:
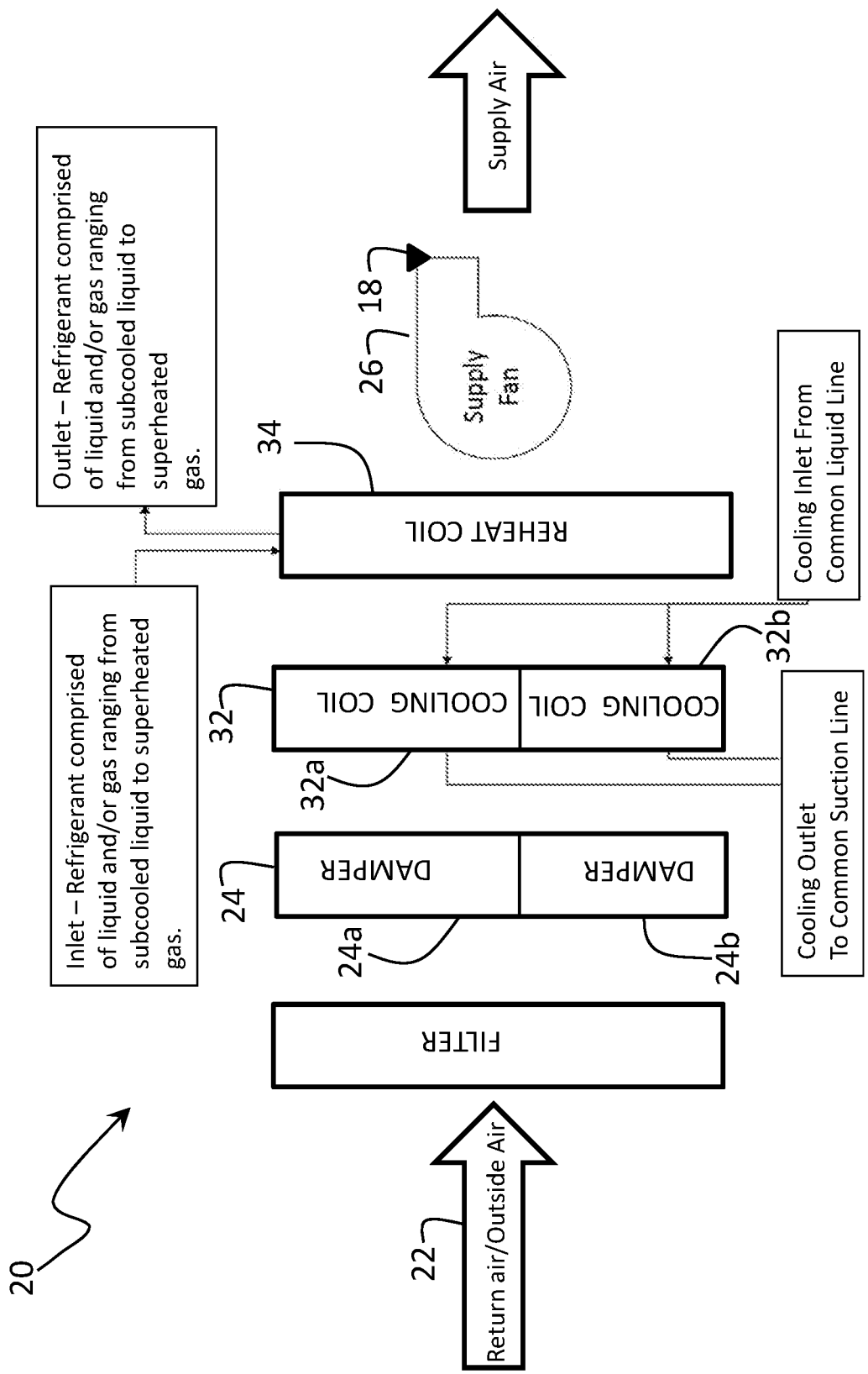
FIG. 1 depicts the configuration of the air flow system of an environmental control system of the present invention.
Figure 2:
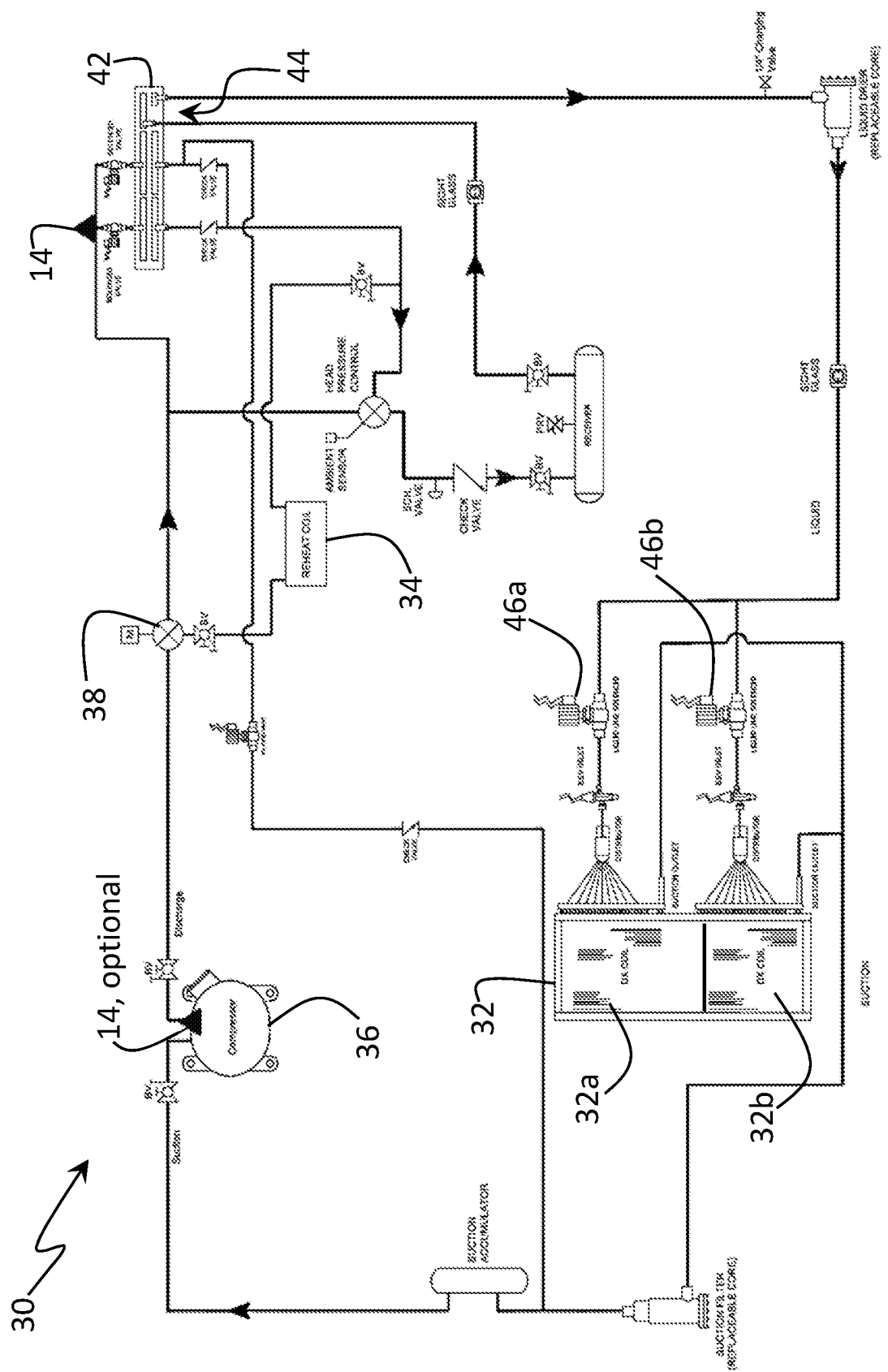
FIG. 2 depicts the refrigeration control system of an environmental control system of the present invention.

In the configuration necessary to provide the desired control of the indoor environment necessary for healthy plant growth, refrigeration system 30 has been configured specifically to maintain the desired dry bulb temperature, dew point and enthalpy of plant environment 5. In the configuration of the present invention, refrigeration system 30 includes a cooling coil 32, reheat coil 34, a compressor 36, a three-way valve 38, a condenser coil 42, and a condenser coil fan 44. Thus, as depicted in FIGS. 1 and 2, refrigeration system 30 shares cooling coil 32 and reheat coil 34 with air supply system 20 as the air flow route through air supply system 20 passes over or through cooling coil 32 and reheat coil 34. In one embodiment, cooling coil 32 is divided into two portions 32a, 32b with each portion supplied with refrigerant from condenser coil 42. Solenoid actuated valves 46a and 46b control the flow of refrigerant to each portion of cooling coil 32.

Controller 10 receives data from sensors and uses the received data to manage the operation of damper 24, compressor 36, cooling coil 32, three-way valve 38, supply fan 26, and condenser coil fan 44. Sensors associated with controller 10 include airflow rate sensor 18, dry bulb temperature sensor 12 located in plant environment 5, sensed control head pressure 14 located at the input side of condenser coil 42 or output side of compressor 36 and dew point sensor 16 located in plant environment 5. Airflow rate sensor 18 provides a differential pressure reading across supply fan 26 to permit calculation of the airflow rate of the supply air produced by climate control system 100.

Controller 10 manages operation of climate control system 100 to maintain set point or target values for dry bulb temperature, dew point and enthalpy. Each set point value has an allowed accepted range for deviation above and below the designated set point value. For dry bulb temperature and dew point, the accepted range for deviation above and below the set point value may be as great as 5° F. or as small as 0.5° F. depending on the plants in plant environment 5. Typically, the "accepted range" above and below the set point value for dry bulb temperature and dew point will be about 2° F. The accepted range for deviation above and below the set point value for enthalpy may be as great as 5 Btu/lb or as small as 0.25 Btu/lb. Typically, the accepted range for enthalpy will be about 1.5 Btu/lb. In general, the set point value for dry bulb temperature may be between about 60° F. and about 85° F. The set point value for dew point may be between about 45° F. and about 75° F. The set point value for enthalpy may be between about 20 Btu/lb and about 40 Btu/lb. For example, if the set point value for dry bulb temperature is 75° F. with an "accepted range" of 2° F., then an acceptable dry bulb temperature will be between 73° F. and 77° F. As explained in more detail below, if the dry bulb temperature is outside of the accepted range, controller 10 will control operation of climate control system 100 to bring the dry bulb temperature back into the accepted range. Each set point value and the accepted deviation range for each set point value will be entered into controller 10 by the user using a control panel, not shown, associated with climate control system 100.

Sensed control head pressure allows controller 10 to determine the saturated condensing temperature of the refrigerant in refrigeration system 30. In general, a predetermined set point will be stored in controller 10 for the control head pressure of compressor 36. If dew point sensor 16 provides a signal indicating that the sensed control head pressure 14 is below the setpoint, then controller 10 will signal condenser coil fan 44 to slow down. If slowing of condenser coil fan 44 does not alleviate the condition, then controller 10 will begin staging off condenser coil 42. Likewise, if the sensed control head pressure is too high, then controller 10 will signal an increase in fan speed for condenser coil fan 44. If increasing the condenser coil fan 44 speed is insufficient, then controller 10 will signal staging on of condenser coil 42.

Through use of controller 10, climate control system 100 provides precise control over the dry bulb temperature, dew point and enthalpy characteristics of plant environment 5. As known to those skilled in the art, the enthalpy of a system can be calculated from the known values of dry bulb temperature and relative humidity or from known values of dry bulb temperature and dew point. Additionally, those skilled in the art recognize that relative humidity can be determined from the dry bulb temperature and dew point. While those skilled in the art will be familiar with the calculation of enthalpy, the following formulas are provided for completeness.

Relevant psychrometric algorithms include:
Atmospheric Pressure $$p = Atm \times (1 - 6.8753 \times 10^{-6} \times Z)^{5.2559}$$

p=inches of Mercury
Atm=29.921299597519
Z=elevation in feet
Water Vapor Saturation Pressure
For 311.67° R<=T=<491.67° R $$pws = \exp(C_1 \div T + C_2 + C_3 \times T + C_4 \times T^2 + C_5 \times T^3 + C_6 \times T^4 + C_7 \times \ln(T))$$

T=absolute temperature, ° R=° F.+459.67
$C_1 = -1.0214165 \times E^4$
$C_2 = -4.8932428 \times E^0$
$C_3 = -5.3765794 \times E^{-3}$
$C_4 = 1.9202377 \times E^{-7}$
$C_5 = 3.5575832 \times E^{-10}$
$C_6 = -9.0344688 \times E^{-14}$
$C_7 = 4.1635019 \times E^0$
For 491.67° R<T=<851.67° R $$pws = \exp(C_8 \div T + C_9 + C_{10} \times T + C_{11} \times T^2 + C_{12} \times T^3 + C_{13} \times \ln(T))$$

T=absolute temperature, ° R=° F.+459.67
$C_8 = -1.0440397 \times E^4$
$C_9 = -1.1294650 \times E^1$
$C_{10} = -2.7022355 \times E^{-2}$
$C_{11} = 1.2890360 \times E^{-3}$
$C_{12} = -2.4780681 \times E^{-9}$
$C_{13} = 6.5459673 \times E^0$
Saturated Humidity Ratio $$W_s = \frac{0.62198 \times f \times p_{ws}}{p - f \times p_{ws}}$$

p=total pressure of moist air
f=enhancement factor
$p_{ws}$=pressure of saturated pure water
Enhancement Factor
  f=calculated in accordance with Hyland and Wexler (1973, "The Second")
Humidity Ratio
  For t*>32° F.

$$W = \frac{(1093 - 0.556 \times t^*) \times W_s^* - c_p \times (t - t^*)}{1093 - 0.444 \times t - t^*}$$

t*=thermodynamic wet-bulb temperature of moist air, ° F.
t=dry-bulb temperature of moist air, ° F.
$c_p$=specific heat of moist air, Btu/lb° F.
$W_s^*$=humidity ratio of moist air at saturation at thermodynamic wet-bulb temperature
For t*<=32° F.

$$W = \frac{(1061 - 0.444 \times t^* - (-143.34 + 0.5 \times (t^* - 32))) \times W_s^* - c_p \times (t - t^*)}{1061 - 0.444 \times t^* - (-143.34 + 0.5 \times (t^* - 32))}$$

t*=thermodynamic wet-bulb temperature of moist air, ° F.
t=dry-bulb temperature of moist air, ° F.
$c_p$=specific heat of moist air, Btu/lb° F.

$W_s^*$=humidity ratio of moist air at saturation at thermodynamic wet-bulb temperature Specific Heat $$c_p = -2.0921943 \times 10^{-14} \times t^4 2.5588383 \times 10^{-11} \times t^3 + 1.2900877 \times 10^{-8} \times t^2 + 5.8045267 \times 10^{-6} \times t + 0.23955919$$

t=dry-bulb temperature of moist air, ° F.

Specific Volume $$v = \frac{0.7543 \times (t + 459.67) \times (1 + 1.6078 \times W)}{p}$$

t=dry-bulb temperature of moist air, ° F.
W=humidity ratio of moist air, mass of water per unit mass of dry air
p=total pressure of moist an Enthalpy $$h = cp \times t + W \times (1061 + 0.444 \times t)$$

t=dry-bulb temperature of moist air, ° F.
W=humidity ratio of moist air, mass of water per unit mass of dry air
$c_p$=specific beat of moist air, Btu/lb° F.

Wet Bulb

Can be determined using an iterative calculation with reference to the Humidity Ratio function.

Dew Point

Can also be determined using an iterative calculation with reference to the Saturated Humidity Ratio function.

With reference to FIGS. 1 and 2, the configuration of climate control system 100 places reheat coil 34 in a parallel position relative to condenser coil 42; however, with reference to the flow of supply air, reheat coil 34 is located after cooling coil 32. Thus, manipulation of three-way valve 38 by controller 10 allows climate control system 100 to efficiently return heat to the supply air after it has passed through cooling coil 32. This configuration improves control over the dew point value of the supply air and the final dry bulb temperature of plant environment 5.

In general, increasing the speed of compressor 36 will lower the temperature of cooling coil 32 resulting in a lower enthalpy in the supply air. If the enthalpy is too high and an increase in compressor speed does not sufficiently lower the enthalpy of plant environment 5 and only a portion 32a or 32b of cooling coil 32 is currently active, then controller 10 will activate the appropriate solenoid actuated valve 46a or 46b to open and stage on the remaining portion 32a or 32b of cooling coil 32 to further lower the enthalpy of supply air. When staging on the remaining portion of cooling coil 32, controller 10 will typically increase the speed of supply fan 26.

Conversely, if the enthalpy of plant environment 5 is too low, then controller 10 will lower compressor speed. The compressor speed reduction will raise the temperature of cooling coil 32 resulting in an increase in dry bulb temperature and/or dew point of the supply air.

Control over dry bulb temperature is provided by reheat coil 34. If plant environment 5 is at a lower temperature than desired, then heat supplied by reheat coil 34 may be added to the supply air to increase air temperature. If plant environment 5 has an enthalpy that is too high, then control of cooling coil 32 through increase of compressor 36 speed will increase the refrigeration capacity of the system and as a result will lower the enthalpy in plant environment 5. Subsequent use of the reheat coil 34 will return the overcooled supply air to the desired temperature. Management of reheat coil 34 is controlled by controller 10 actuating three-way valve 38. Thus, controller 10 uses three-way valve 38 to control the flow of refrigerant to both condenser coil 42 and reheat coil 34 thereby managing overall temperature of plant environment 5.

If, according to the dry bulb temperature sensor, plant environment 5 is too cold, i.e. the temperature is lower than the accepted range for the dry bulb temperature and the situation cannot be remedied by addition of more heat to reheat coil 34 and/or reduction of compressor speed, then controller 10 will direct either solenoid actuated valve 46a or 46b to close thereby removing refrigerant from the corresponding portion 32a or 32b of cooling coil 32. Additionally, in one embodiment damper 24 is a two-part damper which can be managed to block air flow to a portion of cooling coil 32. Thus, in an overcooling situation, either portion 24a or 24b of damper 24 may close to preclude air flow over a portion of cooling coil 32. Generally, if section 32a of cooling coil 32 is no longer receiving refrigerant due to the deactivation of solenoid actuated valve 46a, then damper 24a will close blocking airflow to section 32a. Likewise, if solenoid actuated valve 46b closes then damper 24b will close blocking airflow to section 32b of cooling coil 32.

Figure 3:
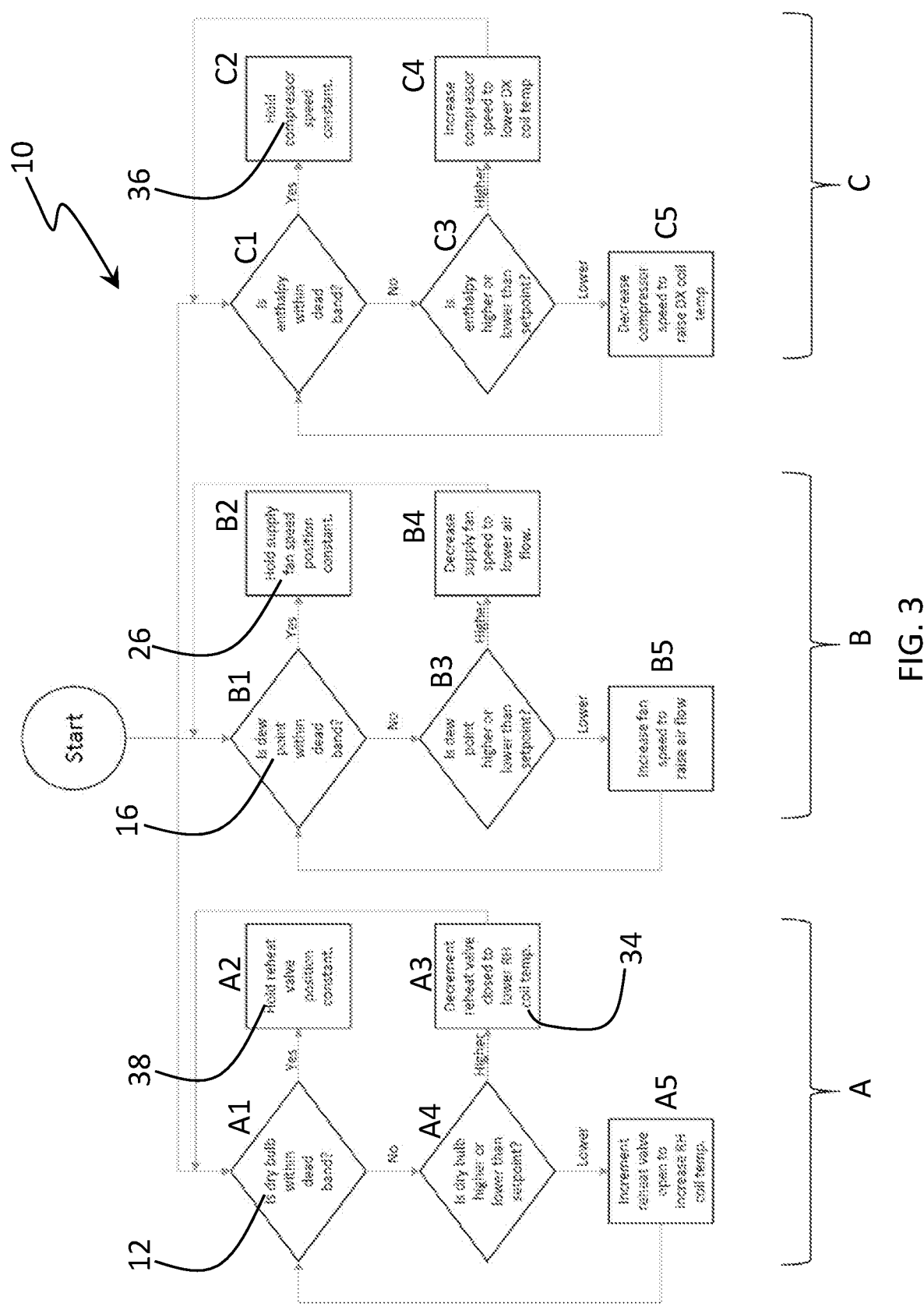
FIG. 3 provides a process flow diagram of the logic used by the controller which manages operation of the environmental control system.

FIG. 3 provides an example of the process logic used by controller 10. As reflected by FIG. 3, controller 10 manages operation of climate control system 100 by operation of three-way valve 38, supply fan 26 and compressor 36. Portion A of FIG. 3 provides the logic for control of dry bulb temperature. For example at A1, if the dry bulb temperature determined by dry bulb temperature sensor 12 is within an accepted range, then controller 10 will maintain the present settings for reheat coil 34 by maintaining three-way valve 38 at its current position A2. However, if controller 10 at A1 determines that the dry bulb temperature is outside of the accepted set point range, then the process moves to A3. At A3, if the dry bulb temperature is above the target set point by more than the accepted range, then controller 10 will direct three-way valve 38 to incrementally close A4 thereby lowering reheat coil temperature. Conversely, if the dry bulb temperature is below the target set point by more than the accepted range, then controller 10 will direct three-way valve 38 to incrementally open A5 thereby increasing reheat coil temperature. Thus, controller 10 continuously monitors the dry bulb temperature sensor 12 and as necessary continues the incremental adjustment of three-way valve 38 to maintain dry bulb temperature within the accepted range of the set point.

Portion B of FIG. 3 provides the logic used by controller 10 for managing operation of supply fan 26 to provide control over the dew point within plant environment 5. As indicated in FIG. 3, when the dew point is within an accepted range B1, then controller maintains the current fan speed for supply fan 26 B2. However, if controller 10 at A1 receives data from dew point sensor 16 indicating that the dew point is outside of the accepted set point range, then the process moves to B3. At B3, if the dew point is above the accepted range, then controller 10 will reduce the fan speed B4 of supply fan 26 thereby lowering air flow into plant environment 5. However, if at B3 the controller receives data from dew point sensor 16 indicating that the dew point is below the accepted range, then controller 10 will increase fan speed of supply fan 26 B5 thereby allowing the dew point to increase. Thus, controller 10 continuously monitors the data provided by dew point sensor 16 and as necessary adjusts the speed of supply fan 26 to maintain the dew point within the accepted range of the set point.

Portion C of FIG. 3 provides the logic used by controller 10 for managing the enthalpy within plant environment 5 through control of compressor 36. Control of compressor 36 manages the temperature of cooling coil 32. If at C1 the enthalpy value is within the accepted range, then the speed of compressor 36 is maintained at the current speed C2. However, if the enthalpy value is above the accepted range, then at C3 controller 10 will direct compressor 36 to increase speed thereby lowering the temperature of cooling coil 32 C4. Conversely, if the enthalpy value is below the accepted range, then at C3 controller 10 will direct compressor 36 to decrease speed C5 thereby increasing the temperature of cooling coil 32. Controller 10 continuously monitors the data provided by dew point sensor 16 and dry bulb temperature sensor to determine the enthalpy value within plant environment 5 and adjusts the speed of compressor 36 as needed to maintain the enthalpy value is within the accepted range of the enthalpy set point.

With continued reference to the FIGS., examples of the operation of climate control system 100 will further explain the configuration and function of climate control system 100.

Figure 4:
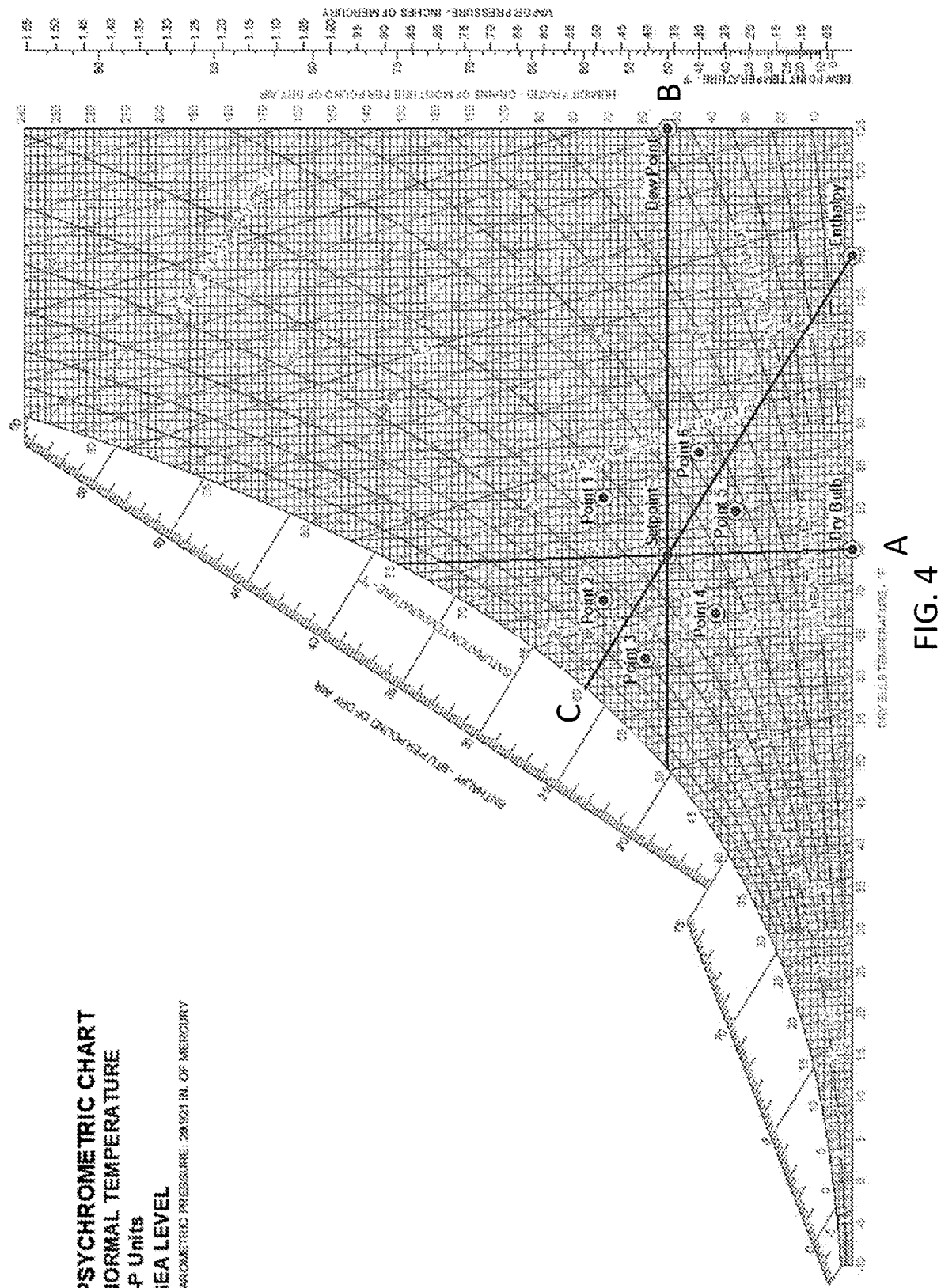
FIG. 4 provides an exemplary psychrometric chart for operation of an environmental control system.

FIG. 4 provides an exemplary psychrometric chart for operation of an environmental control system. In this example, the dry bulb temperature set point is 75° F., the dew point set point is 50° F. and the enthalpy set point is 26.0 Btu/lb as represented by lines A, B and C respectively on FIG. 4. The accepted range for dry bulb temperature set point is 1° F., for the dew point set point is 1° F. and for the enthalpy set point is 1 Btu/lb.

For this first example, dry bulb temperature is 82° F., dew point temperature is 58° F. and enthalpy is 31.0 Btu/lb. Thus, each sensed and calculated value is greater than the upper limit of the respective accepted range. Therefore, controller 10 will direct operation of compressor 36 to increase operational speed thereby lower the temperature of cooling coil 32 to bring the enthalpy value down within the accepted range. Additionally, controller 10 will direct supply fan 26 to decrease speed thereby reducing air flow through plant environment 5 to permit a decrease in the dew point within plant environment 5. Finally, controller 10 will direct three-way valve 38 to begin to close in order to lower the temperature of reheat coil 34 to bring the dry bulb temperature value down within the accepted range.

For this second example, dry bulb temperature is 70° F., dew point temperature is 58° F. and enthalpy is 28.1 Btu/lb. Thus, the enthalpy and dew point values are greater than the upper limit of the respective accepted range and the dry bulb temperature is lower than the lower limit of the accepted range. Therefore, controller 10 will direct operation of compressor 36 to increase operational speed thereby lower the temperature of cooling coil 32 to bring the enthalpy value down within the accepted range. Additionally, controller 10 will direct supply fan 26 to decrease speed thereby reducing air flow through plant environment 5 to permit a decrease in the dew point within plant environment 5. Finally, controller 10 will direct three-way valve 38 to begin to open in order to increase the temperature of reheat coil 34 to bring about an increase in the dry bulb temperature to within the accepted range.

For this third example, dry bulb temperature is 63° F., dew point temperature is 53° F. and enthalpy is 24.5 Btu/lb. Thus, the enthalpy and dry bulb temperature values are lower than the lower limit of the respective accepted range and the dew point is higher than the upper limit of the accepted range. Therefore, controller 10 will direct operation of compressor 36 to decrease compressor speed thereby allowing the temperature of cooling coil 32 to increase which will result in an increase of the enthalpy value within plant environment 5 to the accepted range. Additionally, controller 10 will direct three-way valve 38 to begin to open in order to increase the temperature of reheat coil 34 to bring about an increase in the dry bulb temperature to within the accepted range. Finally, controller 10 will direct supply fan 26 to decrease speed thereby reducing air flow through plant environment 5 to permit a decrease in the dew point within plant environment 5.

For this fourth example, dry bulb temperature is 68° F., dew point temperature is 42° F. and enthalpy is 22.5 Btu/lb. Thus, each value is lower than the lower limit of the respective accepted range. Therefore, controller 10 will direct operation of compressor 36 to decrease compressor speed thereby allowing the temperature of cooling coil 32 to increase which will result in an increase of the enthalpy value within plant environment 5 to the accepted range. To increase the dew point within plant environment 5, controller 10 will direct supply fan 26 to increase speed thereby increasing air flow through plant environment 5. Finally, controller 10 will direct three-way valve 38 to begin to open in order to increase the temperature of reheat coil 34 to bring about an increase in the dry bulb temperature to within the accepted range.

For this fifth example, dry bulb temperature is 80° F., dew point temperature is 38° F. and enthalpy is 24.5 Btu/lb. Thus, the enthalpy and dew point values are lower than the lower limit of the respective accepted range and the dry bulb temperature is higher than the upper limit of the accepted range. Therefore, controller 10 will direct supply fan 26 to increase speed thereby increasing air flow through plant environment 5 to lower the dew point within plant environment 5. Additionally, controller 10 will direct three-way valve 38 to begin to close in order to lower the temperature of reheat coil 34 to bring the dry bulb temperature value down within the accepted range. Finally, controller 10 will direct operation of compressor 36 to decrease compressor speed thereby allowing the temperature of cooling coil 32 to increase which will result in an increase of the enthalpy value within plant environment 5 to the accepted range.

For this sixth example, dry bulb temperature is 87° F., dew point temperature is 45° F. and enthalpy is 27.8 Btu/lb. Thus, the enthalpy and dry bulb temperature values are higher than the upper limit of the respective accepted range and the dew point is lower than the lower limit of the accepted range. Therefore, controller 10 will direct operation of compressor 36 to increase operational speed thereby lowering the temperature of cooling coil 32 to bring the enthalpy value down within the accepted range. Additionally, controller 10 will direct three-way valve 38 to begin to close in order to lower the temperature of reheat coil 34 to bring the dry bulb temperature value down within the accepted range. Finally, controller 10 will direct supply fan 26 to increase speed thereby increasing air flow through plant environment 5 to increase the dew point within plant environment 5.

In each of the above examples, controller 10 will continue to monitor the dry bulb temperature sensor 12, the dew point sensor 16 and to calculate the enthalpy of plant environment 5 based on the monitored values. Controller 10 will continuously monitor the sensed values and calculated values and adjust the operation of compressor 36, supply fan 26 and three-way valve 38 to maintain the respective values in the accepted range of the selected set points. Additionally, as noted above, when manipulation of these components is insufficient, controller 10 may further manage the operation of solenoid actuated valves 46a, 46b and dampers 24a, 24b to manage dry bulb temperature and/or enthalpy through increasing the temperature of cooling coil 32.

Other embodiments of the present invention will be apparent to one skilled in the art. As such, the foregoing description merely enables and describes the general uses and methods of the present invention. Accordingly, the following claims define the true scope of the present invention.

What is claimed is:

1. A method for maintaining the dry bulb temperature, dew point and enthalpy within an indoor plant growing environment comprising:
    establishing a set point value for the dry bulb temperature of the indoor plant growing environment and establishing an accepted range above and below the dry bulb temperature set point value;
    establishing a set point value for the dew point of the indoor plant growing environment and establishing an accepted range above and below the dew point set point value;
    establishing a set point value for the enthalpy of the indoor plant growing environment and establishing an accepted range above and below the enthalpy set point value;
    monitoring the dry bulb temperature of the indoor plant growing environment with a dry bulb temperature sensor;
    monitoring the dew point of the indoor plant growing environment with a dew point sensor;
    providing the monitored values of dry bulb temperature and dew point to a controller and said controller calculating the enthalpy of the indoor plant growing environment;
    providing said indoor plant growing environment with an air supply system and a refrigeration system;
    using the controller to manage the operation of the air supply system and said refrigeration system to maintain the dry bulb temperature within the accepted range above and below the dry bulb temperature set point value;
    using the controller to manage the operation of the air supply system and said refrigeration system to maintain the dew point within the accepted range above and below the dew point set point value; and,
    using the controller to manage the operation of the air supply system and said refrigeration system to maintain the enthalpy within the accepted range above and below the enthalpy set point value.

2. The method of claim 1, wherein said refrigeration system comprises:
    a compressor, a three-way valve, a condenser coil, a cooling coil and a reheat coil positioned in parallel with said condenser coil; and,
    said method further comprising the step of directing said three-way valve to incrementally close thereby lowering the temperature of the reheat coil when the monitored dry bulb temperature is greater than the accepted range for the dry bulb temperature set point value.

3. The method of claim 1, wherein said refrigeration system comprises:
    a compressor, a three-way valve, a condenser coil, a cooling coil and a reheat coil positioned in parallel with said condenser coil; and,
    said method further comprising the step of directing said three-way valve to incrementally open thereby raising the temperature of the reheat coil when the monitored dry bulb temperature is less than the accepted range for the dry bulb temperature set point value.

4. The method of claim 1, wherein said refrigeration system comprises:
    a compressor, a three-way valve, a condenser coil, a cooling coil and a reheat coil positioned in parallel with said condenser coil; and,
    said method further comprising the step of directing said compressor to increase operational speed thereby lowering the temperature of the cooling coil when the calculated enthalpy value is greater than the accepted range for the enthalpy set point value.

5. The method of claim 1, wherein said refrigeration system comprises:
    a compressor, a three-way valve, a condenser coil, a cooling coil and a reheat coil positioned in parallel with said condenser coil; and,
    said method further comprising the step of directing said compressor to decrease operational speed thereby increasing the temperature of the cooling coil when the calculated enthalpy value is lower than the accepted range for the enthalpy set point value.

6. The method of claim 1, wherein said refrigeration system comprises:
    a compressor, a three-way valve, a condenser coil, a cooling coil, a reheat coil positioned in parallel with said condenser coil and downstream of said cooling coil, a first solenoid actuated valve controlling flow of refrigerant to a first portion of said cooling coil and a second solenoid actuated valve controlling flow of refrigerant to a second portion of said cooling coil;
    said air supply system comprises:
    a source of return air, a first damper portion and a second damper portion,
    said first and second damper portions independently operable, and an air supply fan; and,
    said method further comprising the steps of:
    directing said compressor to decrease operational speed thereby increasing the temperature of the cooling coil when the calculated enthalpy value is lower than the accepted range for the enthalpy set point value; and,
    directing said first solenoid actuated valve to close thereby removing refrigerating from said first portion of said cooling coil and allowing said cooling coil to increase in temperature.

7. The method of claim 6, further comprising the step of closing said first damper portion.

8. The method of claim 1, wherein said air supply system comprises:
    return air, a damper and an air supply fan; and,
    said method further comprising the step of directing said air supply fan to decrease speed when the monitored dew point is greater than the accepted range for the dew point set point value thereby lowering the dew point within the indoor plant growing environment.

9. The method of claim 1, wherein said air supply system comprises:
    return air, a damper and an air supply fan; and,
    said method further comprising the step of directing said air supply fan to increase speed when the monitored dew point is less than the accepted range for the dew point set point value thereby increasing the dew point within the indoor plant growing environment.

* * * * *